April 21, 1925.

H. H. TALBOT

CLUTCH MECHANISM

Filed Jan. 7, 1922

INVENTOR.
Howard H. Talbot
by O. M. Clark
Attorney

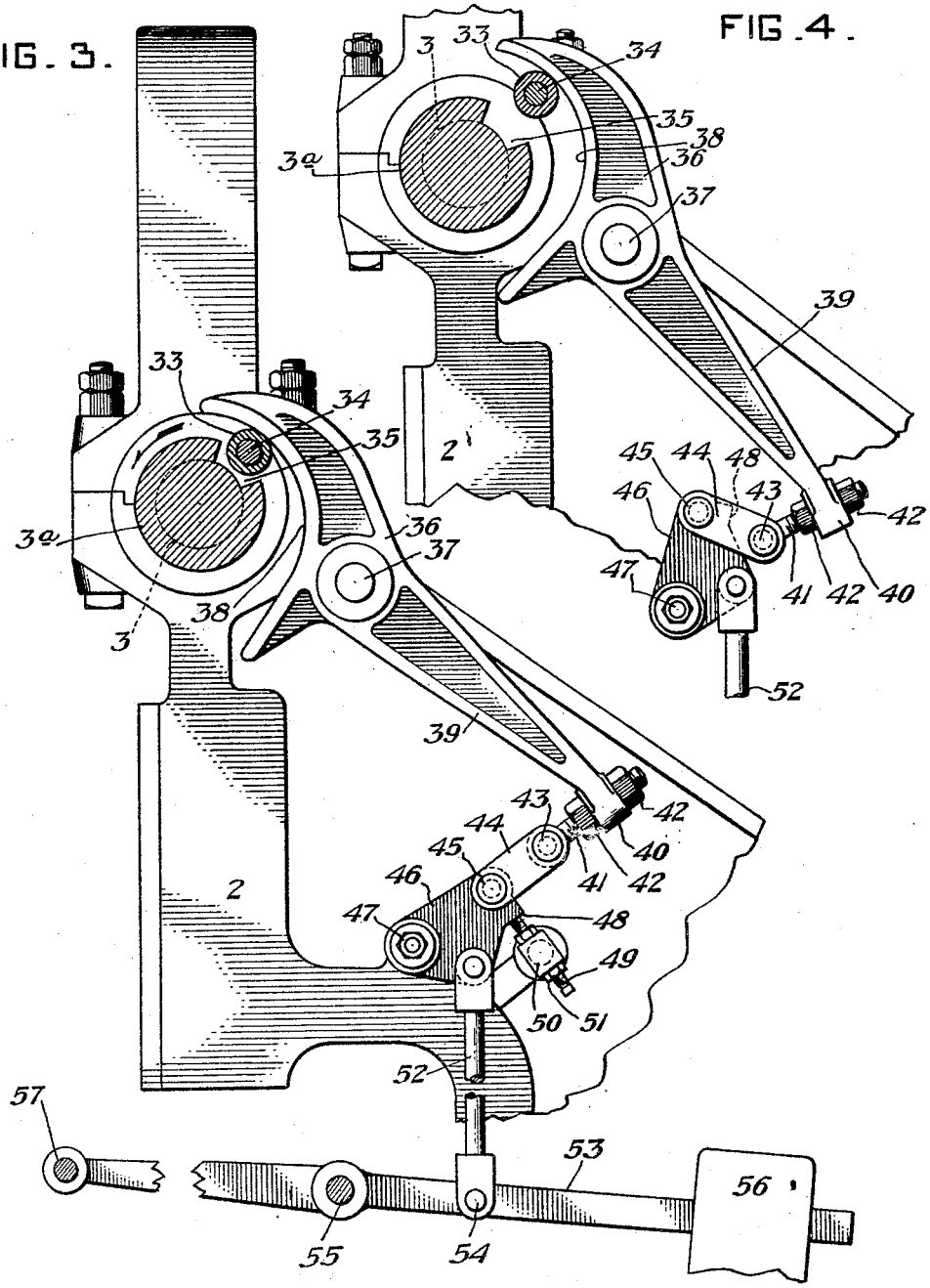

Patented Apr. 21, 1925.

1,534,882

UNITED STATES PATENT OFFICE.

HOWARD H. TALBOT, OF WOOSTER, OHIO, ASSIGNOR, BY MESNE ASSIGNMENTS, TO MACKINTOSH-HEMPHILL COMPANY, OF PITTSBURGH, PENNSYLVANIA, A CORPORATION OF PENNSYLVANIA.

CLUTCH MECHANISM.

Application filed January 7, 1922. Serial No. 527,641.

*To all whom it may concern:*

Be it known that I, HOWARD H. TALBOT, a citizen of the United States, residing at Wooster, in the county of Wayne and State of Ohio, have invented certain new and useful Improvements in Clutch Mechanism, of which the following is a specification.

My invention is an improvement in clutch mechanism, particularly adapted for use in a shear or other intermittently operating machine, capable of being thrown into engagement as desired by the operator through suitable actuating mechanism, and to automatically resume an inoperative position, upon release thereof.

The objects in view are to provide means which may be bodily incorporated in a crank shaft for shifting a clutch member towards and from the co-acting clutch member of a rotatably mounted gear, acting as the transmitting member from a driving gear, through the crank shaft, to the shear or other machine. Also, an external adjustable intermittently operable cam member adapted to normally maintain the clutch operating mechanism and the clutch in "open" position, capable of being intermittently set by the operator to effect clutch engagement during one throw of the crank by mere pressure and release of an operating treadle, together with various other features of construction and operation as shall be more fully hereinafter described.

Referring to the drawings which show one preferred embodiment of the invention,

Fig. 3 is a view of the cam and its adjusting mechanism in elevation and in operative relation to the crank shaft, shown in section, indicated by the line III—III of Fig. 1, showing the mechanism in its normal position for maintaining the clutch open;

Fig. 4 is a similar view showing the cam thrown to operative position to effect clutch engagement.

Figure 1:
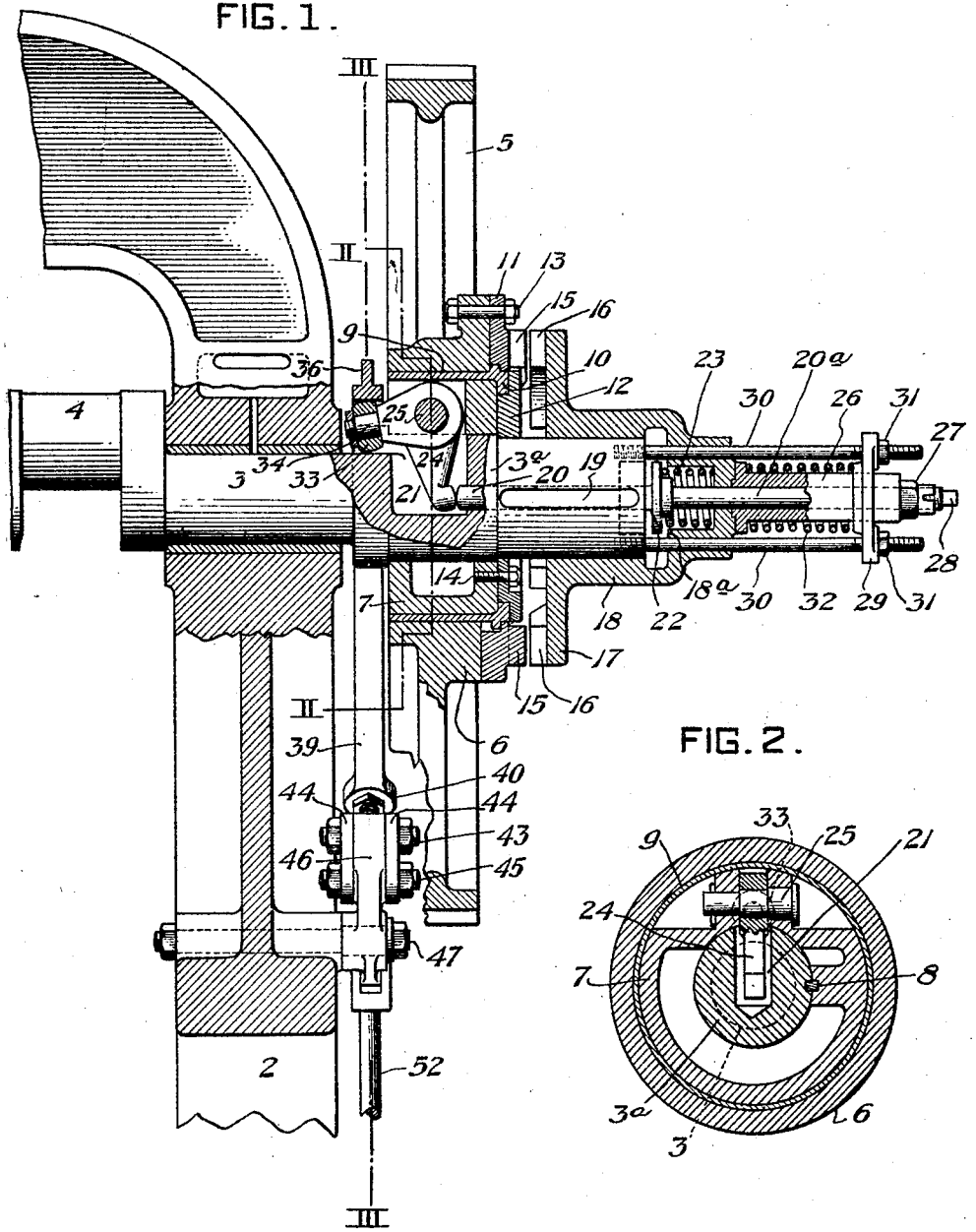
Fig. 1 is a view in elevation, partly in section, showing the mechanism as applied to the crank shaft of a shear or other similar machine.
Figure 2:
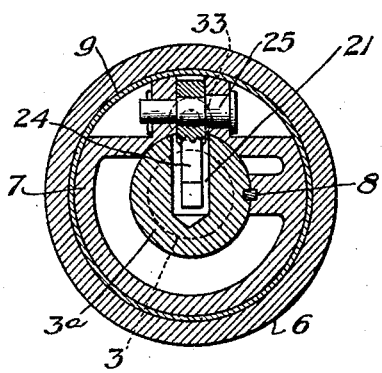
Fig. 2 is a cross section on the line II—II of Fig. 1.

In the drawings, 2 is a portion of the housing frame of a shear or other similar machine provided with a main crank shaft 3 having a crank or wrist pin 4 adapted to actuate the pitman of the shear, etc., as desired, intermittently. 5 is a gear wheel loosely journalled by its hub 6 upon an enlarged hub member 7 which is fixedly connected with the enlarged portion $3^a$ of shaft 3 by a key 8. An intervening ring bushing 9 provides for friction-reducing mounting of the gear thereon, said ring being retained in position by its terminal flange 10 and supplemental end plates 11 and 12, respectively secured to hubs 6 and 7 respectively by bolts 13 and 14, as will be readily understood. By such mounting, rotative friction of the gear 5 is reduced to a minimum and endwise movement is prevented so as to maintain the gear continuously in operative position around the laterally extending enlarged portion $3^a$ of the crank shaft.

End plate 11 is provided with the clutch teeth or lugs 15 of any suitable construction adapted to be engaged by similar inter-engaging teeth or lugs 16 of the longitudinally slidable head 17 mounted by its neck or sleeve 18 upon the extended portion of the enlarged shaft section $3^a$. Sleeve 18 is splined thereto by a key 19, whereby to maintain the slidable clutch member in operative relation to the shaft at all times, so that when the clutch teeth 16 are thrust into engagement with teeth 15, motion will be transmitted from gear 5 to the shaft.

The movable clutch member is normally thrust away from engagement, as in Fig. 1, by a centrally mounted thrust pin 20 extending by its inner terminal into a recess 21 and outwardly through the end of the shaft section, as shown. Stem 20 is provided with an annular flange abutment 22 between which and the outer end portion of sleeve 18 is inserted a spring 23. The main function of spring 23 is to effect additional outward movement of clutch member 17 after teeth 16 have been disengaged from teeth 15 by positive action of stem 20 and its abutment 22. The annular flange 22 is larger in diameter than the cavity in sleeve 18, containing spring 23, and therefore upon compression of this spring this flange engages directly the inner annular face $18^a$ of the sleeve. Stem 20 extends beyond abutment 22 by an extension $20^a$ through a tubular housing 26, and is provided at its outer end with one or more lock nuts 27 and a terminal, preferably squared, extension 28. Tubular housing 26 directly abuts the outer end of sleeve 18. Spring 23 therefore normally functions to keep the flange 22 removed a certain distance from the aforementioned internal annular face 18ª of the sleeve 18, the magnitude of this distance being capable of adjustment by nuts 27. Within the set limits of this distance or possible travel of pin 20 relative to the sleeve 18, spring 23 functions to exert outward clutch opening pressure by thrusting pin 20 inwardly against the terminal of a bell crank lever 24 pivotally mounted by pin 25 in recess 21, when outer controlling pressure on the lever is exerted. A cross-head 29 is slidably mounted on housing extension 26 and is connected by rods 30—30 with the end of shaft extension 3ª, into which the rods are tapped, as shown.

The inward pressure of the cross head is controlled by adjusting nuts 31, and between the cross-head and the inner flanged end of housing 26, which abuts directly against the end of sleeve 18, is an outwardly pressing spring 32. Said spring 32 therefore is the main clutch operating spring and functions to move sleeve 18 on the shaft extension 3ª and clutch teeth 16 inwardly into clutch engagement with the teeth 15 of the clutch plate 11 of the gear hub 6. During such engagement, shaft 3 will be rotated. Spring 23, it will be understood, is somewhat stronger or stiffer than spring 32.

Assuming the clutch in engaged position, with pressure on bell crank lever 24 released. Then, if pressure is rather quickly applied by the bell crank lever 24 to the pin 20, pin 20 moves outwardly and due to the inertia of the slidable clutch member 17 and sleeve 18, and due to the friction of contact of the engaged teeth 15 and 16, the spring 23 is compressed until flange 22 abuts face 18ª. Whereupon, sleeve 18 is moved, compressing spring 32, until clutch jaws 15 and 16 are disengaged with consequent cessation of motion of pin 20. Then, since spring 23 is stronger than spring 32, a further movement of sleeve 18 takes place until stopped by the sleeve 26 coming against lock nut 27. The end faces of the jaws 15 and 16 are thus separated by a distance equivalent to this latter movement or travel, and bumping of the jaw faces is prevented.

For the purpose of controlling the operation of the mechanism just described, I have provided an external cam capable of normally holding the bell crank lever 24 in a depressed position, with its inner terminal bearing against and thrusting back pin 20. Upon release of such pressure, spring actuated re-action of the bell crank lever will be effected during an intermittent operation period, by momentarily shifting the cam 36 away from its normal depressing position.

The outer arm of the bell crank lever 24 is provided with a roller 33 mounted upon a terminal stem 34 of the bell crank and retained thereon by a nut, as shown. The enlarged portion 3ª of shaft 3 is cut away for clearance of roller 33, as indicated at 35, for normally depressing said roller and the bell crank, as shown in Figs. 1 and 3.

The cam member 36 for such device is pivotally mounted on the housing exteriorly of the shaft and to one side of the gear 5 for clearance upon a stud bolt or pin 37, and is provided with an inner partly annular face 38, somewhat eccentric to the center of shaft 3. Cam 36 is provided with a downwardly extending lever 39 connected by its terminal 40 with a pin 41 having nuts 42 for adjustment of the lever toward or from the pivotal center 43 of a toggle link 44. Said link is pivoted at 45 to the actuating toggle arm or member 46, which in turn is pivotally mounted at 47 on the housing frame 2. Toggle section 46 is provided with a bearing portion 48 adapted in normal position to come into contact with the end of an adjusting bearing bolt 49. Said bolt is mounted in the lug 50 of the housing, and is provided with adjusting and securing nuts 51, so that the bolt may be set and fastened to the desired position to provide an arresting abutment for the toggle lever mechanism. When lowered as in Fig. 3, this mechanism is locked against movement except when thrust upwardly by the connecting rod 52 between toggle member 46 and operating lever 53, to which it is pivoted at 54.

Operating lever 53 is pivotally mounted on a suitable bearing at 55, and is provided at one end with a counterweight 56 and at the other end with a treadle connection 57, by which the operator may depress the treadle end and elevate the connecting rod 52, to thrust the toggle mechanism upwardly and the cam face 38 outwardly, as in Fig. 4. In such position, the roller 33 of bell crank lever 24, due to the additional outward clearance thus provided, will pass outwardly under pressure of stem 20, during which time the clutch member 17 will be thrust into engagement with the clutch teeth of the gear 5.

The operation as thus described is as follows.

Upon thrusting the cam actuating mechanism upwardly by the treadle operated lever, and the clutch members being engaged, the shaft 3 will be rotated in the direction of the arrow, Fig. 3, effecting the desired throw of crank 4. The shearing or other operation having been performed and the treadle having been released, and roller 33 having passed around outwardly beyond the face of cam 38, the clutch engagement will continue until, the cam having then been relocated in its normal closed position by releasing the treadle (Fig. 3), roller 33 will be brought around into engagement with the closed cam face, will be depressed thereby, and bell crank lever 24 will be actuated, thrusting pin 20 outwardly and transmitting through flange 22, face 18ª and spring 23 outward movement to the clutch sleeve 18 to disengage the clutch members and terminate the shaft movement. The mechanism will then remain in such inoperative position until, upon pressing the treadle, the same operation above described may be repeated.

The advantages of the construction and operation will be understood and appreciated by all those familiar with this class of mechanism, and it will be understood that it may be incorporated with various kinds of power actuated intermittently operated machines within the province of the designing engineer or builder.

What I claim is:

1. Clutch mechanism comprising a shaft provided with a longitudinally movable clutch member in splined engagement therewith, a loosely mounted driving gear on the shaft having a co-acting clutch member, means carried by the shaft for operatively actuating the movable clutch member including a central thrust pin and a spring opposing its movement, and an exteriorly controlled bell crank lever for the thrust pin rotatably mounted with the shaft for normally holding the clutch open.

2. Clutch mechanism comprising a shaft provided with a longitudinally movable clutch member in splined engagement therewith, a loosely mounted driving gear on the shaft having a co-acting clutch member, means carried by the shaft for operatively actuating the movable clutch member including a central thrust pin and a spring opposing its movement, a bell crank lever pivoted within the shaft having an inner arm engaging the thrust pin and an outer arm provided with a bearing roller, an outer cam annularly disposed with relation to the bearing roller, and means for actuating the cam to bring it into operative engagement therewith.

3. The combination with a rotatable shaft having a gear member journalled therearound provided with a clutch member, a longitudinally movable thrust pin in the shaft, and means for actuating said pin; of a clutch member splined on the shaft, an inwardly pressing spring therefor, an outwardly pressing spring therefor, and means on the thrust pin for exerting outward movement through said outwardly pressing spring to said clutch member.

4. The combination with a rotatable shaft having a gear member journalled therearound provided with a clutch member, a longitudinally movable thrust pin in the shaft, and means for actuating said pin; of a co-acting longitudinally movable clutch member splined on the shaft having an extended housing, an outer spring abutment, rods connecting it with the end of the shaft, a spring between said abutment and the co-acting clutch member, an abutment on the thrust pin, and an outwardly pressing spring between said abutment and a portion of the movable clutch member.

5. The combination with a rotatable shaft having a centrally arranged thrust pin provided with an inner abutment and an outer adjusting nut; of a longitudinally movable clutch member splined on the shaft having an inner spring socket and an outer sleeve, a bearing crosshead on said sleeve and retaining means connecting it with the shaft, a spring between said crosshead and the clutch member, and a spring seated in said socket engaging the thrust pin abutment exerting outward pressure on the clutch member.

6. The combination with a rotatable shaft having a centrally arranged thrust pin provided with an inner abutment and an outer adjusting nut; of a longitudinally movable clutch member splined on the shaft having an inner spring socket and an outer sleeve, a bearing crosshead on said sleeve and retaining means connecting it with the shaft, a spring between said crosshead and the clutch member, and a spring of greater strength than said spring seated in said socket engaging the thrust pin abutment and subject to compression thereby and increased outward pressure against the clutch member.

7. In combination, a crank shaft having a hub, a driving gear and clutch member rotatably mounted thereon, a co-acting longitudinally movable clutch member in splined engagement with the shaft, spring mechanism normally tending to close one clutch member with the other, a resisting pin therefor centrally mounted in the shaft, a bell crank lever pivotally mounted in the shaft hub having one arm engaging said pin and the other extending beyond the hub, and a controlling cam for the bell crank lever mounted independently of the shaft and provided with means for adjusting it toward or from the lever.

8. In combination, a crank shaft having a hub, a driving gear and clutch member rotatably mounted thereon, a co-acting longitudinally movable clutch member in splined engagement with the shaft, spring mechanism normally tending to close one clutch member with the other, a resisting pin therefor centrally mounted in the shaft, a bell crank lever pivotally mounted in the shaft hub having one arm engaging said pin and the other extending beyond the hub and provided with a roller, and a pivotally mounted cam having a curved face for engagement with the bell crank roller and means for actuating it to operative and inoperative positions respectively.

9. The combination with a normally stationary recessed crank shaft having a recessed hub and a freely rotatable driving gear thereon provided with a clutch member, a clutch member for engagement therewith, and a controlling lever therefor mounted in the recessed crank shaft and hub provided with a projecting roller terminal; of a pivoted lever having an embracing eccentric cam face for the roller, toggle mechanism for the lever, adjusting mechanism and a stop device for the toggle mechanism, and an actuating lever having a link connecting it with the toggle mechanism.

In testimony whereof I hereunto affix my signature.

HOWARD H. TALBOT.